United States Patent
Okaza et al.

(10) Patent No.: US 7,765,816 B2
(45) Date of Patent: Aug. 3, 2010

(54) START-UP CONTROL METHOD FOR REFRIGERATION CYCLE APPARATUS AND REFRIGERATION CYCLE CONTROL APPARATUS USING THE SAME

(75) Inventors: Noriho Okaza, Osaka (JP); Kazuo Nakatani, Osaka (JP); Masato Mekata, Shiga (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 960 days.

(21) Appl. No.: 11/266,494

(22) Filed: Nov. 4, 2005

(65) Prior Publication Data
US 2006/0096306 A1    May 11, 2006

(30) Foreign Application Priority Data
Nov. 4, 2004    (JP) .............................. 2004-320225

(51) Int. Cl.
G05D 23/32    (2006.01)
F25B 41/00    (2006.01)
F25B 41/04    (2006.01)
F25B 13/00    (2006.01)

(52) U.S. Cl. .................... 62/158; 62/196.1; 62/197; 62/204; 62/210; 62/324.6

(58) Field of Classification Search ............... 62/158, 62/161, 183, 196.1, 197, 204, 210, 324.6
See application file for complete search history.

(56) References Cited

U.S. PATENT DOCUMENTS

| | | | | |
|---|---|---|---|---|
| 4,366,425 A | * | 12/1982 | Shen ........................ 318/779 |
| 4,860,552 A | * | 8/1989 | Beckey ...................... 62/158 |
| 4,941,325 A | * | 7/1990 | Nuding ....................... 62/158 |
| 5,050,397 A | * | 9/1991 | Sugiyama et al. ............. 62/175 |
| 5,095,714 A | * | 3/1992 | Adachi et al. ................ 62/197 |
| 5,165,250 A | * | 11/1992 | Nagatomo et al. ............ 62/158 |
| 5,303,562 A | * | 4/1994 | Bahel et al. .................. 62/222 |
| 5,408,837 A | * | 4/1995 | Omura ......................... 62/89 |
| 5,771,700 A | * | 6/1998 | Cochran ...................... 62/117 |
| 5,918,474 A | * | 7/1999 | Khanpara et al. ............. 62/179 |
| 6,736,620 B2 | * | 5/2004 | Satoh .......................... 418/6 |
| 6,883,339 B2 | * | 4/2005 | Park et al. ..................... 62/180 |
| 2004/0118138 A1 | * | 6/2004 | Nakatani et al. .............. 62/197 |

FOREIGN PATENT DOCUMENTS

JP    51-65456    6/1976
JP    56-112896   9/1981

* cited by examiner

Primary Examiner—Frantz F. Jules
Assistant Examiner—Travis Ruby
(74) Attorney, Agent, or Firm—Kratz, Quintos & Hanson, LLP

(57) ABSTRACT

In a refrigeration cycle apparatus having an expansion mechanism, a method to swiftly generate a pressure difference upstream and downstream of the expansion mechanism of, thereby enhancing the starting performance of the refrigeration cycle apparatus The apparatus has a compression mechanism, a utilizing-side heat exchange, an expansion mechanism for recovering power, and a heat source-side heat exchanger. The revolution number of the heat source fluid transfer means is made smaller than a target revolution number or the heat source fluid transfer means is stopped during a predetermined time after the compression mechanism is started. When the compression mechanism is started, the pressure difference can be generated upstream and downstream of the expansion mechanism for a short time, the operation of the expansion mechanism does not become unstable, vibration and noise can be prevented, and the refrigeration cycle apparatus can swiftly be started.

3 Claims, 7 Drawing Sheets

START-UP CONTROL METHOD FOR REFRIGERATION CYCLE APPARATUS AND REFRIGERATION CYCLE CONTROL APPARATUS USING THE SAME

TECHNICAL FIELD

The present invention relates to a control method of a refrigeration cycle apparatus having an expansion mechanism for recovering power, and a refrigeration cycle apparatus using the control method.

BACKGROUND TECHNIQUE

There is a proposed refrigeration cycle apparatus in which an expansion mechanism is provided instead of a decompressor, pressure energy generated at the time of expansion is recovered as power, thereby enhancing COP (see patent documents 1 and 2 for example). The expansion mechanism used in such a refrigeration cycle apparatus is rotated by a pressure difference between a high pressure (pressures in an outlet of the compression mechanism, a radiator and an inlet of the expansion mechanism) and a low pressure (pressures in an outlet of the expansion mechanism, the evaporator, and an inlet of the compression mechanism). Usually, when the refrigeration cycle apparatus is stopped, the high pressure and the low pressure are equalized, and a pressure difference is not generated between the high pressure and the low pressure until the compression mechanism is started.

[Patent Document 1] Japanese Patent Application Laid-open No. S51-65456

[Patent Document 2] Japanese Patent Application Laid-open No. S56-112896

In the conventional techniques, however, since the expansion mechanism is rotated by the pressure difference between the high pressure and the low pressure and the power is recovered, there is a problem that it is difficult to generate the pressure difference at the time of starting operation of the expansion mechanism, the operation or behavior of the expansion mechanism becomes unstable, and it takes a long time to start the refrigeration cycle apparatus.

To solve the above problem, in a refrigeration cycle apparatus having an expansion mechanism, it is an object of the present invention to swiftly generate a pressure difference upstream and downstream of the expansion mechanism, thereby enhancing the starting performance of the refrigeration cycle apparatus.

According to a control method of the refrigeration cycle apparatus of the present invention, in the refrigeration cycle apparatus having the expansion mechanism, it is possible to swiftly generate a pressure difference upstream and downstream of the expansion mechanism, thereby enhancing the starting performance of the refrigeration cycle apparatus.

DISCLOSURE OF THE INVENTION

A first aspect of the present invention provides control method of a refrigeration cycle apparatus comprising at least a compression mechanism, a heat source-side heat exchanger, an expansion mechanism for recovering power, and a utilizing-side heat exchanger, wherein during a predetermined time after the compression mechanism is started, revolution number of heat source fluid transfer means which transfers a heat source fluid to the heat source-side heat exchanger is made smaller than target revolution number or the heat source fluid transfer means is stopped. According to this aspect, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

A second aspect of the present invention provides a control method of a refrigeration cycle apparatus comprising at least a compression mechanism, a heat source-side heat exchanger, an expansion mechanism for recovering power, and a utilizing-side heat exchanger, wherein during a predetermined time after the compression mechanism is started, revolution number of utilizing fluid transfer means which transfers a utilizing fluid to the utilizing-side heat exchanger is made smaller than target revolution number or the utilizing fluid transfer means is stopped. According to this aspect, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

A third aspect of the present invention provides a control method of a refrigeration cycle apparatus comprising at least a compression mechanism, a heat source-side heat exchanger, an expansion mechanism for recovering power, a utilizing-side heat exchanger, a bypass flow path for bypassing the expansion mechanism, and a bypass valve provided on the bypass flow path, wherein during a predetermined time after the compression mechanism is started, an opening of the bypass valve is made smaller than a target opening. According to this aspect, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

A fourth aspect of the present invention provides a control method of a refrigeration cycle apparatus comprising at least a compression mechanism, a heat source-side heat exchanger, an expansion mechanism for recovering power, a utilizing-side heat exchanger, and a pre-decompressor for decompressing a refrigerant flowing into the expansion mechanism, wherein during a predetermined time after the compression mechanism is started, an opening of the pre-decompressor is made smaller than a target opening. According to this aspect, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

A fifth aspect of the present invention provides a control method of a refrigeration cycle apparatus comprising at least a compression mechanism, a heat source-side heat exchanger, an expansion mechanism for recovering power, a utilizing-side heat exchanger, and starting pressure difference determination means for determining a magnitude of a pressure difference generated upstream and downstream of the expansion mechanism when the compression mechanism is started, wherein when the starting pressure difference determination means determines that the pressure difference is smaller than a predetermined value, revolution number of heat source fluid transfer means which transfers a heat source fluid to the heat source-side heat exchanger is made smaller than target revolution number or the heat source fluid transfer means is stopped during a predetermined time after the compression mechanism is started. According to this aspect, even when the pressure difference upstream and downstream of the expansion mechanism is small when the compression mechanism is started, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

A sixth aspect of the present invention provides a control method of a refrigeration cycle apparatus comprising at least a compression mechanism, a heat source-side heat exchanger, an expansion mechanism for recovering power, a utilizing-side heat exchanger, and starting pressure difference determination means for determining a magnitude of a pressure difference generated upstream and downstream of the expansion mechanism when the compression mechanism is started, wherein when the starting pressure difference determination means determines that the pressure difference is smaller than a predetermined value, revolution number of utilizing fluid transfer means which transfers a utilizing fluid to the utilizing-side heat exchanger is made smaller than target revolution number or the utilizing fluid transfer means is stopped during a predetermined time after the compression mechanism is started. According to this aspect, even when the pressure difference upstream and downstream of the expansion mechanism is small when the compression mechanism is started, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

A seventh aspect of the present invention provides a control method of a refrigeration cycle apparatus comprising at least a compression mechanism, a heat source-side heat exchanger, an expansion mechanism for recovering power, a utilizing-side heat exchanger, a bypass flow path for bypassing the expansion mechanism, a bypass valve provided on the bypass flow path, and starting pressure difference determination means for determining a magnitude of a pressure difference generated upstream and downstream of the expansion mechanism when the compression mechanism is started, wherein when the starting pressure difference determination means determines that the pressure difference is smaller than a predetermined value, an opening of the bypass valve is made smaller than a target opening during a predetermined time after the compression mechanism is started. According to this aspect, even when the pressure difference upstream and downstream of the expansion mechanism is small when the compression mechanism is started, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

An eighth aspect of the present invention provides a control method of a refrigeration cycle apparatus comprising at least a compression mechanism, a heat source-side heat exchanger, an expansion mechanism for recovering power, a utilizing-side heat exchanger, a pre-decompressor for decompressing a refrigerant flowing into the expansion mechanism, and starting pressure difference determination means for determining a magnitude of a pressure difference upstream and downstream of the expansion mechanism when the compression mechanism is started, wherein when the starting pressure difference determination means determines that the pressure difference is smaller than a predetermined value, an opening of the pre-decompressor is made smaller than a target opening during a predetermined time after the compression mechanism is started. According to this aspect, even when the pressure difference upstream and downstream of the expansion mechanism is small when the compression mechanism is started, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

According to a ninth aspect of the present invention, in the control method of the refrigeration cycle apparatus of any one of the first to eighth aspects, the expansion mechanism is a scroll type expansion mechanism. According to this aspect, even if the expansion mechanism is of the scroll type expansion mechanism whose operation easily becomes unstable and which generates noise when the compression mechanism is started, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

According to a tenth aspect of the present invention, in the control method of the refrigeration cycle apparatus of any one of the fifth to eighth aspects, the starting pressure difference determination means determinates based on a detection value of heat source fluid temperature detection means which detects temperature of a heat source fluid transferred to the heat source-side heat exchanger. According to this aspect, it is possible to inexpensively determine whether the pressure difference upstream and downstream of the expansion mechanism is small without using an expensive pressure sensor.

According to an eleventh aspect of the present invention, in the control method of the refrigeration cycle apparatus of any one of the fifth to eighth aspects, the starting pressure difference determination means determinates based on a detection value of utilizing fluid temperature detection means which detects temperature of a utilizing fluid transferred to the utilizing-side heat exchanger. According to this aspect, it is possible to inexpensively determine whether the pressure difference upstream and downstream of the expansion mechanism is small without using an expensive pressure sensor.

A twelfth aspect of the present invention provides a refrigeration cycle apparatus using the control method of the refrigeration cycle apparatus according to any one of first to eleventh aspects. According to this aspect, the pressure difference can be generated upstream and downstream of the expansion mechanism for a short time when the compression mechanism is started, the operation of the expansion mechanism does not become unstable, vibration and noise can be prevented, and the refrigeration cycle apparatus can swiftly be started.

Figure 1:
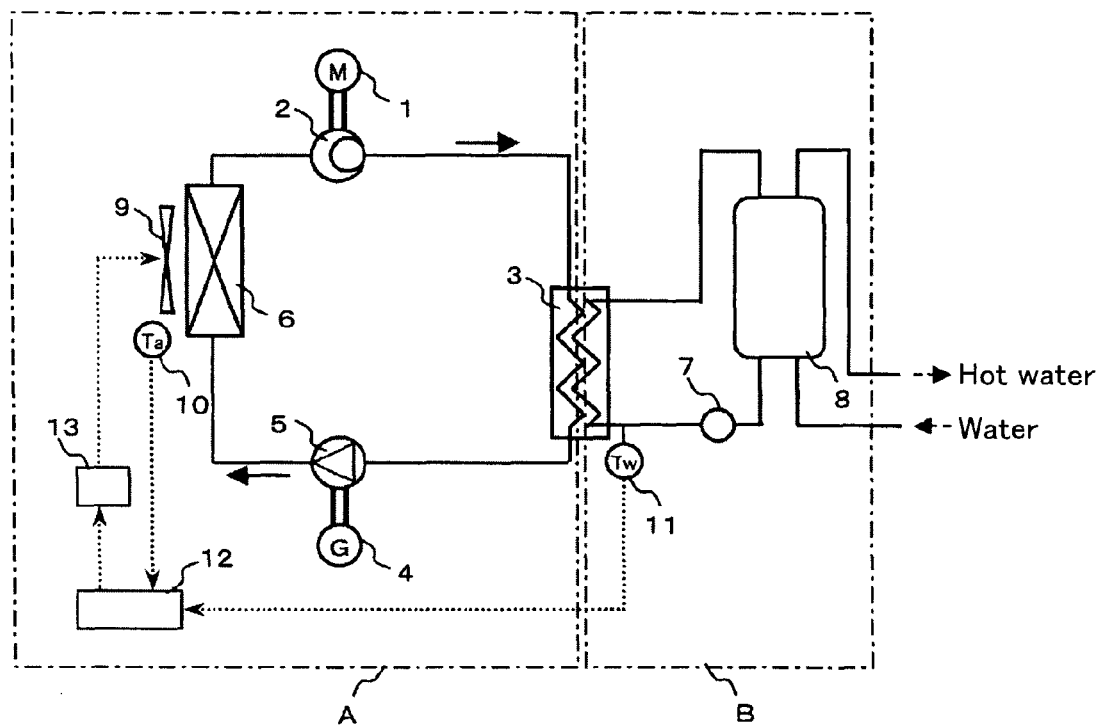
FIG. 1 is a block diagram showing a refrigeration cycle apparatus according to a first embodiment of the present invention.

EXPLANATION OF SYMBOLS 1, 21 electric motor
2, 22 compression mechanism
3, 24 radiator
4 power generator
5, 27 expansion mechanism
6, 28 evaporator
7 feed pump
8 boiler
9 air blower
10, 40 outside air temperature detection means
11 water incoming temperature detection means
12, 42 starting pressure difference determination means
13 air blower revolution number operating means
14 pump revolution number operating means
23 first four-way valve
25 second four-way valve
26 pre-decompressor
29 heat source-side air blower
30 utilizing-side air blower
31 bypass flow path
32 bypass valve
41 indoor temperature detection means
43 discharge temperature detection means
44 bypass valve opening operating means
45 pre-decompressor opening operating means

BEST MODE FOR CARRYING OUT THE INVENTION

First Embodiment

Embodiments of the present invention will be explained with reference to the drawings. The invention is not limited to the embodiments.

Figure 2:
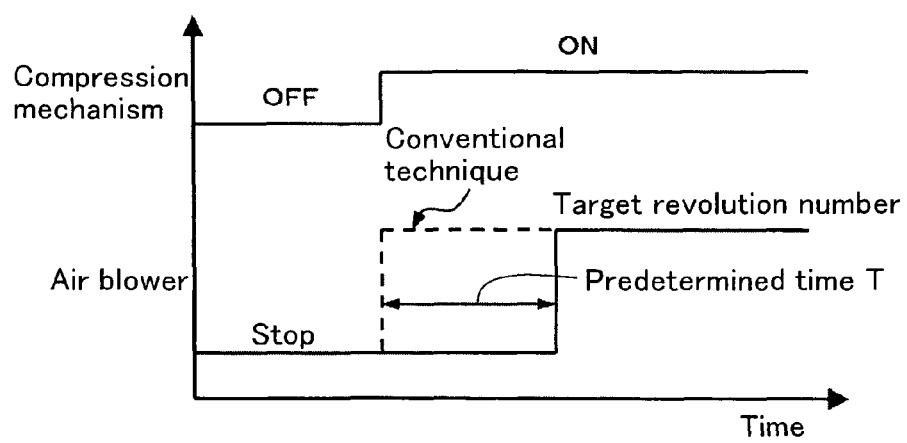
FIG. 2 is a time chart showing a control method of the refrigeration cycle apparatus of the embodiment.

FIG. 1 is a block diagram showing a refrigeration cycle apparatus according to a first embodiment of the present invention, and FIG. 2 is a time chart showing a control method of the refrigeration cycle apparatus of the embodiment.

The refrigeration cycle apparatus shown in FIG. 1 includes a refrigerant circuit A into which a carbon dioxide refrigerant is charged as a refrigerant, and a fluid circuit B through which utilizing fluid flows. The refrigerant circuit A includes a compression mechanism 2 driven by an electric motor 1, a refrigerant flow path of a radiator 3 as a utilizing-side heat exchanger, an expansion mechanism 5 from which power is recovered by a power generator 4, an evaporator 6 as a heat source-side heat exchanger, and the like. The fluid circuit B includes a feed pump 7 as utilizing fluid transfer means, a fluid flow path of the radiator 3, a boiler 8, and the like.

The refrigeration cycle apparatus of this embodiment includes an air blower 9 as heat source fluid transfer means for sending heat source fluid (e.g., outside air) to the evaporator 6, outside air temperature detection means 10 as heat source fluid temperature detection means for detecting the outside air temperature, water incoming temperature detection means 11 as utilizing fluid temperature detection means for detecting the temperature of utilizing fluid (e.g., water) with which heat is exchanged a refrigerant by the radiator 3, starting pressure difference determination means 12 for determining whether a pressure difference at the time of starting operation of the compression mechanism 2 is small, and air blower revolution number operating means 13 as heat source fluid transfer amount operating means for calculating and operating the number of revolutions (revolution number, hereinafter) of the air blower 9 based on signals from the starting pressure difference determination means 12 and the like.

Action when the refrigeration cycle apparatus having the above-described structure is operated will be explained next.

In the refrigerant circuit A, the carbon dioxide refrigerant is compressed to a pressure exceeding a critical pressure by the compression mechanism 2. The compressed refrigerant is brought into a high temperature and high pressure state, and the refrigerant radiates heat to water flowing through the fluid flow path of the radiator 3 when the refrigerant flows through the refrigerant flow path of the radiator 3, and the refrigerant is cooled. Thereafter, the refrigerant is decompressed by the expansion mechanism 5 and is brought into a low temperature and low pressure liquid-gas two phase state. The pressure energy recovered by the expansion mechanism 5 at the time of expansion is transmitted to the power generator 4 and converted into electricity. The refrigerant decompressed by the expansion mechanism 5 is supplied to the evaporator 6. In the evaporator 6, the refrigerant is heated by outside air sent by the air blower 9, and is brought into a liquid-gas two phase state or a gas state. The refrigerant which flows out from the evaporator 6 is sucked by the compression mechanism 2 again.

In the fluid circuit B, utilizing fluid (e.g., water) is sent from a bottom of the boiler 8 to the fluid flow path of the radiator 3 by the feed pump 7, the utilizing fluid is heated by a refrigerant flowing through the refrigerant flow path of the radiator 3, and becomes high temperature fluid (e.g., hot water). The high temperature fluid is stored in the boiler 8 from its top. By repeating such a cycle, the refrigeration cycle apparatus of the embodiment can be utilized as a water heater.

Here, when the refrigeration cycle apparatus is to be started, or when the temperature of outside air (outside air temperature) with which heat is exchanged a refrigerant by the evaporator 6 is high, or when the temperature of water (water incoming temperature) with which heat is exchanged the refrigerant by the radiator 3 is low, a pressure difference is less prone to be generated upstream and downstream of the expansion mechanism 5, the operation of the expansion mechanism 5 becomes unstable, vibration or noise is generated, and it takes time to start the refrigeration cycle apparatus. Especially when the expansion mechanism 5 is of a scroll type, a refrigerant leaks from a gap generated between an orbiting scroll and a fixed scroll, the refrigerant can not be expanded sufficiently, and there is a high possibility that vibration or noise is generated, and that it takes time to start the refrigeration cycle apparatus.

According to the refrigeration cycle apparatus of the embodiment, however, when the starting pressure difference determination means 12 determines that a pressure difference at the time of starting operation becomes small, the air blower revolution number operating means 13 is appropriately controlled.

That is, as shown in the time chart in FIG. 2, the air blower 9 is started when a predetermined time (T) is elapsed after the compression mechanism 2 is started. After the predetermined time (T) is elapsed, the revolution number of the air blower 9 is brought into the target revolution number which is determined by operation frequency of the compression mechanism 2. Thus, the pressure in the evaporator 6 (i.e., low pressure) is reduced faster, and a pressure difference can be generated upstream and downstream of the expansion mechanism 5 for a short time. Therefore, the operation of the expansion mechanism 5 does not become unstable, vibration and noise can be prevented, and the refrigeration cycle apparatus can swiftly be started.

Figure 3:
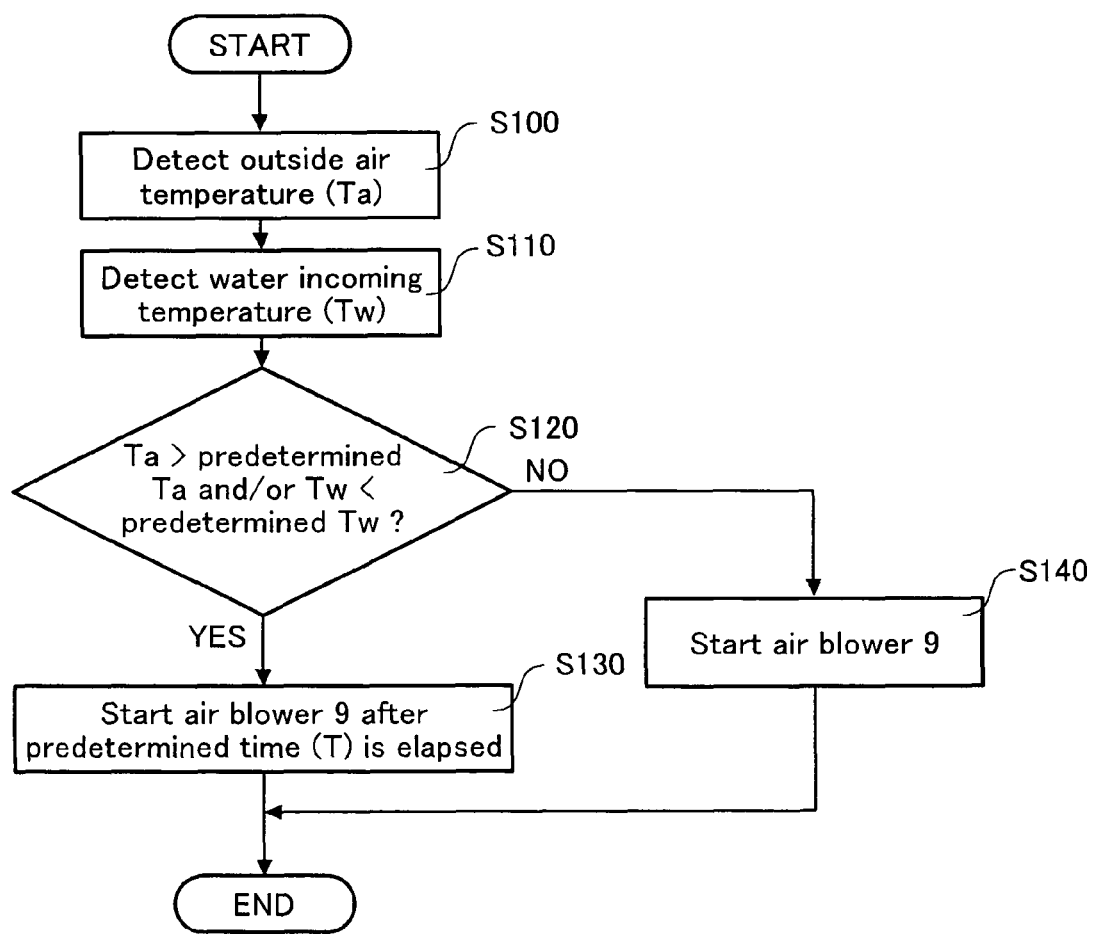
FIG. 3 is a flowchart showing the control method of the refrigeration cycle apparatus of the embodiment.

Next, a further concrete control method will be explained. The control method of the refrigeration cycle apparatus in the embodiment will be explained based on a flowchart shown in FIG. 3.

When the refrigeration cycle apparatus is started, a detection value (outside air temperature Ta) from the outside air temperature detection means 10 is obtained (step 100). A detection value (water incoming temperature Tw) from the water incoming temperature detection means 11 is obtained (step 110). A predetermined outside air temperature (predetermined Ta) which is previously stored in a ROM or the like is compared with the outside air temperature obtained in step 100 (step 120), and/or a predetermined water incoming temperature (predetermined Tw) which is stored in the ROM or the like is compared with the water incoming temperature obtained in step 110 (step 120).

When the outside air temperature is higher than a predetermined outside air temperature and/or when the water incoming temperature is lower than a predetermined water incoming temperature, the air blower 9 is started when the predetermined time (T) is elapsed after the compression mechanism 2 is started (step 130). In other cases, the air blower 9 is immediately started after the compression mechanism 2 is started in accordance with a normal starting method (step 140).

According to the control method of the refrigeration cycle apparatus of the embodiment, even when the outside air temperature is high or the water incoming temperature is low, a pressure (i.e., low pressure) in the evaporator 6 is reduced faster, and it is possible to generate a pressure difference upstream and downstream of the expansion mechanism 5 for a short time. Therefore, the operation of the expansion mechanism 5 does not become unstable, vibration and noise can be prevented, and the refrigeration cycle apparatus can swiftly be started.

The starting pressure difference determination means 12 determines the pressure difference at the time of starting operation based on the outside air temperature or the water incoming temperature. Therefore, it is possible to inexpensively determine whether the pressure difference between upstream and downstream of the expansion mechanism 5 is small without using an expensive pressure sensor.

Although the air blower 9 is stopped for the predetermined time (T) in the embodiment, the same effect can also be obtained even if the revolution number is lowered (reduced) to a value lower than the target revolution number for the predetermined time (T). Further, the predetermined time (T) may be varied in accordance with the outside air temperature or the water incoming temperature.

In the embodiment, the starting pressure difference determination means 12 determines whether the pressure difference upstream and downstream of the expansion mechanism 5 based on the outside air temperature or the water incoming temperature. Alternatively, the starting pressure difference determination means 12 may determine the same based on a detection value of pressure sensors provided upstream and downstream of the expansion mechanism 5, or a detection value of a temperature sensor which detects the temperature of the radiator 3 or the evaporator 6. Alternatively, the air blower 9 may always be stopped for the predetermined time (T) at the time of starting operation without depending on the determination of the starting pressure difference determination means 12.

Second Embodiment

Figure 4:
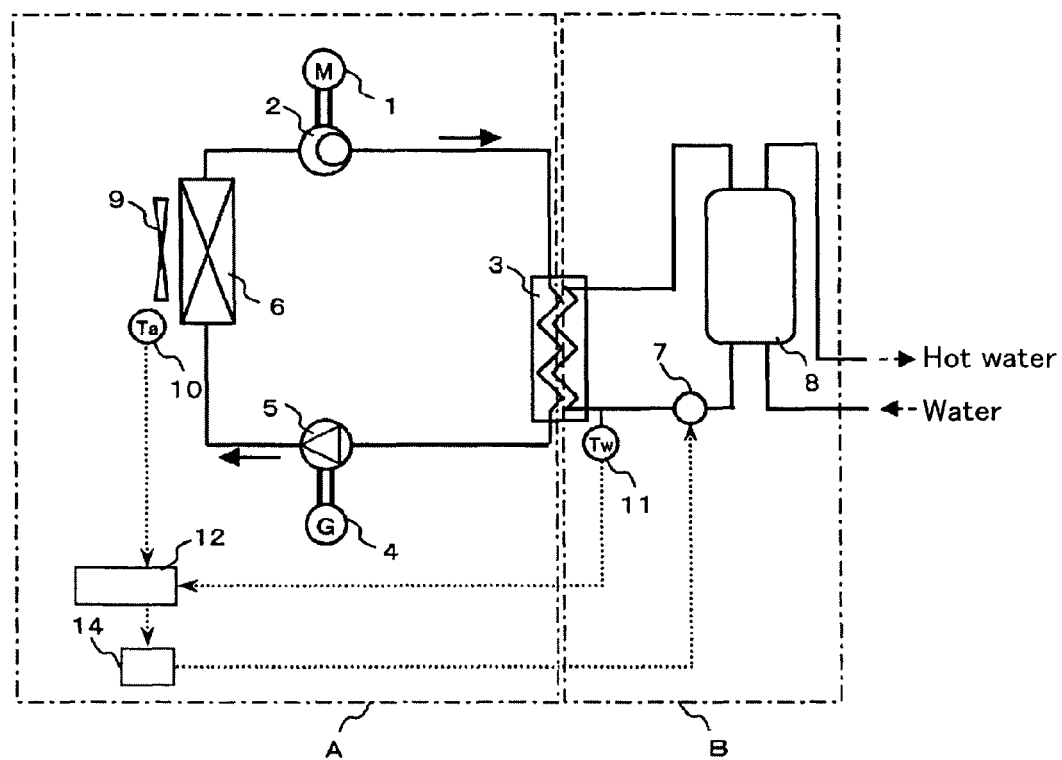
FIG. 4 is a block diagram showing a refrigeration cycle apparatus according to a second embodiment of the invention.
Figure 5:
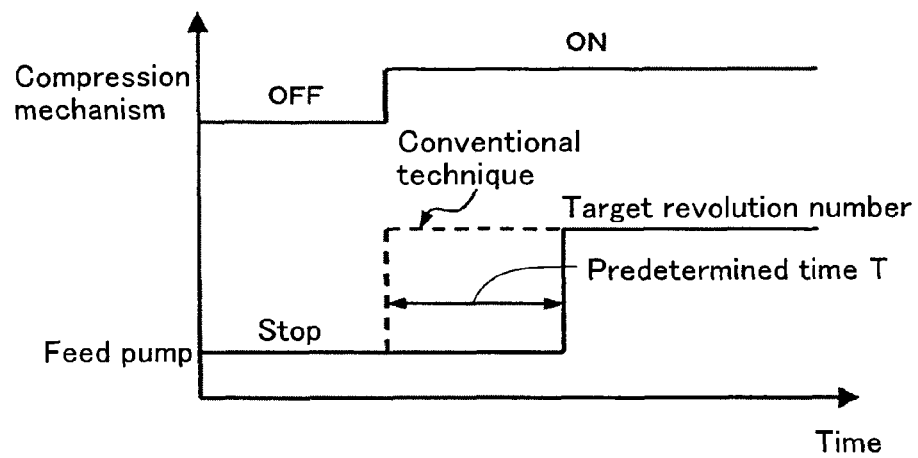
FIG. 5 is a time chart showing a control method of the refrigeration cycle apparatus of the embodiment.

FIG. 4 is a block diagram showing a refrigeration cycle apparatus according to a second embodiment of the invention, and FIG. 5 is a time chart showing a control method of the refrigeration cycle apparatus of the embodiment.

In the refrigeration cycle apparatus of the second embodiment shown in FIG. 4, the same constituent elements as those of the first embodiment shown in FIG. 1 are designated with the same symbols, explanation thereof will be omitted, and different structure and its operation from those of the first embodiment will be explained.

In the second embodiment, the air blower revolution number operating means 13 of the first embodiment is not provided. Instead, in the second embodiment, there is provided pump revolution number operating means 14 as the utilizing fluid transfer amount operating means which calculates and operates the revolution number of the feed pump 7 based on signals from the starting pressure difference determination means 12 and other elements.

In the refrigeration cycle apparatus of the embodiment, when the starting pressure difference determination means 12 determines that the pressure difference at the time of starting operation becomes small, the pump revolution number operating means 14 is appropriately controlled.

That is, as shown in the time chart in FIG. 5, the feed pump 7 is started when the predetermined time (T) is elapsed after the compression mechanism 2 is started. After the predetermined time (T) is elapsed, the revolution number of the feed pump 7 is brought into a target revolution number determined by a water temperature (hot water outgoing temperature) at the outlet of the radiator 3. Thus, the pressure in the radiator 3 (i.e., high pressure) rises faster, and the pressure difference can be generated upstream and downstream of the expansion mechanism 5 for a short time. Therefore, the operation of the expansion mechanism 5 does not become unstable, vibration and noise can be prevented, and the refrigeration cycle apparatus can swiftly be started.

Although the feed pump 7 is stopped for the predetermined time (T) in this embodiment, the same effect can also be obtained even if the revolution number is lowered (reduced) to a value lower than the target revolution number for the predetermined time (T). Further, the predetermined time (T) may be varied in accordance with the outside air temperature or the water incoming temperature.

In the embodiment, the starting pressure difference determination means 12 determines whether the pressure difference upstream and downstream of the expansion mechanism 5 is small based on the outside air temperature or the water incoming temperature. Alternatively, the starting pressure difference determination means 12 may determine the same based on a detection value of pressure sensors provided upstream and downstream of the expansion mechanism 5, or a detection value of a temperature sensor which detects the temperature of the radiator 3 or the evaporator 6. Alternatively, the feed pump 7 may always be stopped for the predetermined time (T) at the time of starting operation.

The first and second embodiments have been explained while taking the case of the water heater, but the invention is not limited to the water heater, and the invention may be applied to an air conditioner. Although the pressure energy at the time of expansion by the expansion mechanism 5 is electrically recovered by the power generator 4 in the above explanation, the compression mechanism 2 and the expansion mechanism 5 may be connected to each other through one shaft, and the driving operation of the compression mechanism 2 may be assisted using the recovered energy.

Third Embodiment

Figure 6:
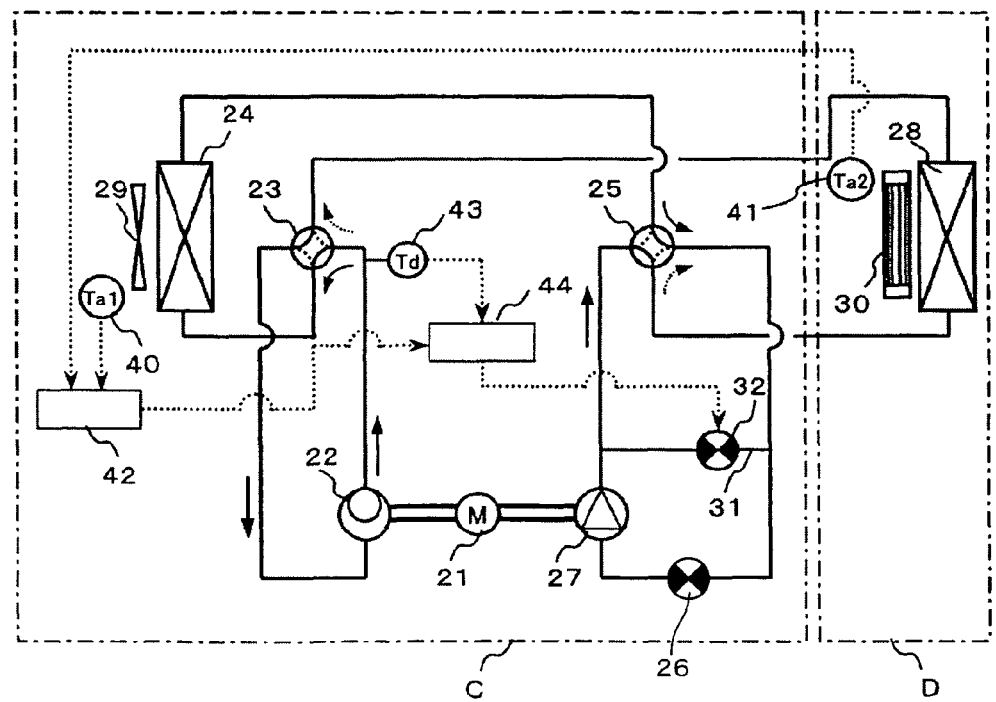
FIG. 6 is a block diagram showing a refrigeration cycle apparatus according to a third embodiment of the invention.
Figure 7:
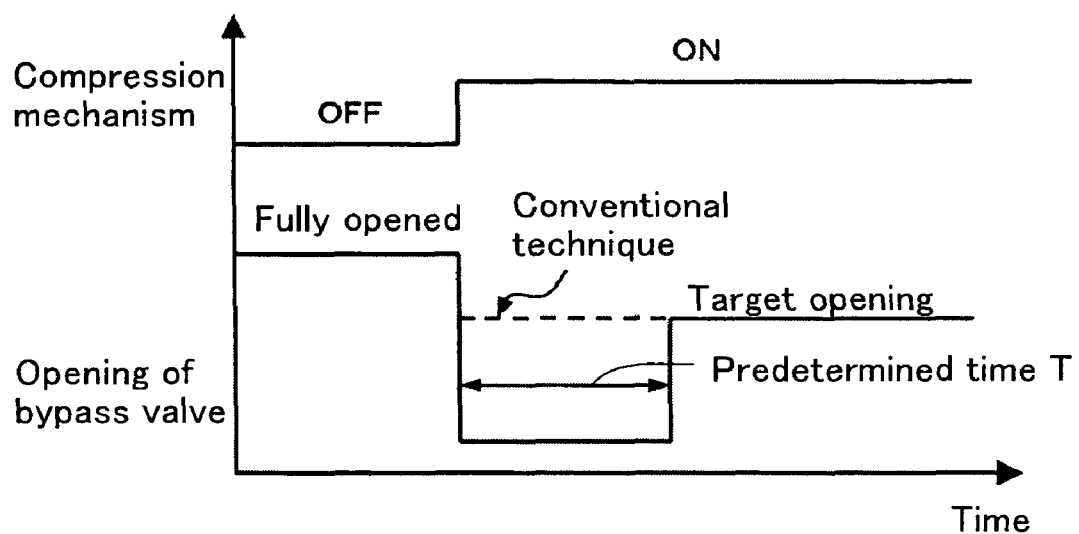
FIG. 7 is a time chart showing a control method of the refrigeration cycle apparatus of the embodiment.

FIG. 6 is a block diagram showing a refrigeration cycle apparatus according to a third embodiment of the invention, and FIG. 7 is a time chart showing a control method of the refrigeration cycle apparatus of the embodiment.

The refrigeration cycle apparatus shown in FIG. 6 has a refrigeration cycle. The refrigeration cycle includes a compression mechanism 22 driven by an electric motor 21, a first four-way valve 23 for switching between a cooling operation and a heating operation, a heat source-side heat exchanger 24, a second four-way valve 25, an expansion mechanism 27 which is connected to the compression mechanism 22 and the electric motor 21 through one shaft for recovering power, and a utilizing-side heat exchanger 28. As a refrigerant, R410A is charged into the refrigeration cycle.

The refrigeration cycle apparatus includes a bypass flow path 31 for bypassing the expansion mechanism 27, a bypass valve 32 for adjusting a flow rate of the refrigerant flowing into the expansion mechanism 27, and outside air temperature detection means 40 as heat source fluid temperature detection means for detecting the outside air temperature.

In this embodiment, the refrigeration cycle apparatus further includes a heat source-side air blower 29 as heat source fluid transfer means for sending heat source fluid (e.g., outside air) to the heat source-side heat exchanger 24, a utilizing-side air blower 30 as the utilizing fluid transfer means for sending utilizing fluid (e.g., air in a room) to the utilizing-side heat exchanger 28, indoor temperature detection means 41 as the utilizing fluid temperature detection means, starting pressure difference determination means 42 for determining whether a pressure difference when the refrigeration cycle apparatus is started is small, discharge temperature detection means 43 for detecting the temperature of a refrigerant discharged from the compression mechanism 22, and bypass valve opening operating means 44 for calculating and operating opening of the bypass valve 32 based on signals of the starting pressure difference determination means 42 and the discharge temperature detection means 43.

In this embodiment, the refrigeration cycle apparatus includes an outdoor unit C and an indoor unit D. The outdoor unit C accommodates therein main constituent elements such as the compression mechanism 22, the first four-way valve 23, the heat source-side heat exchanger 24, the expansion mechanism 27, the heat source fluid temperature detection means 40 and the bypass valve opening operating means 44. The indoor unit D accommodates the utilizing-side heat exchanger 28, the utilizing-side air blower 30 and the utilizing fluid temperature detection means 41.

Next, the operation when the refrigeration cycle apparatus having the above-described structure is operated will be explained.

First, the cooling operation will be explained. A refrigerant compressed by the compression mechanism 22 is brought into high temperature and high pressure state, and flows into the heat source-side heat exchanger 24 through the first four-way valve 23 which is switched in the direction of the solid line in the drawing. The heat source-side heat exchanger 24 functions as a radiator, and the refrigerant is cooled by a heat source fluid (e.g., outside air) sent by the heat source-side air blower 29. The refrigerant flows through the second four-way valve 25 which is switched in the direction of the solid line in the drawing and then, the refrigerant is decompressed to an intermediate pressure by a pre-decompressor 26 such that the density of the refrigerant becomes appropriate density, and the refrigerant flows into the expansion mechanism 27. Then, the refrigerant is decompressed by the expansion mechanism 27, and is brought into a low temperature and low pressure liquid-gas two phase state. The pressure energy when the power is recovered by the expansion mechanism 27 at the time of expansion assists the operation of the compression mechanism 22 through the connected shaft.

The refrigerant decompressed by the expansion mechanism 27 is supplied to the utilizing-side heat exchanger 28. The utilizing-side heat exchanger 28 functions as an evaporator. The refrigerant is heated by a utilizing fluid (e.g., air in a room) sent by the utilizing-side air blower 30, and is brought into a liquid-gas two phase state or a gas state. The refrigerant which flows out from the utilizing-side heat exchanger 28 is sucked by the compression mechanism 22 again. By repeating such a cycle, the refrigeration cycle apparatus of the embodiment can cool a room in which an indoor unit C is disposed.

Next, the heating operation will be explained. The refrigerant compressed by the compression mechanism 22 is brought into a high temperature and high pressure state, and flows into the utilizing-side heat exchanger 28 through the first four-way valve 23 which is switched in the direction of the broken line in the drawing. The utilizing-side heat exchanger 28 functions as a radiator, and the refrigerant is cooled by a utilizing fluid (e.g., air in a room) sent by the utilizing-side air blower 30. The refrigerant flows through the second four-way valve 25 which is switched in the direction of the broken line in the drawing and then, the refrigerant is decompressed to an intermediate pressure by a pre-decompressor 26 such that the density of the refrigerant becomes appropriate density, and the refrigerant flows into the expansion mechanism 27. Then, the refrigerant is decompressed by the expansion mechanism 27, and is brought into a low temperature and low pressure liquid-gas two phase state. The pressure energy when the power is recovered by the expansion mechanism 27 at the time of expansion assists the operation of the compression mechanism 22 through the connected shaft.

The refrigerant decompressed by the expansion mechanism 27 is supplied to the heat source-side heat exchanger 24. The heat source-side heat exchanger 24 functions as an evaporator, the refrigerant is heated by a heat source fluid (e.g., outside air) sent by the heat source-side air blower 29, and the refrigerant is brought into a liquid-gas two phase state or a gas state. The refrigerant which flows out from the heat source-side heat exchanger 24 is again sucked by the compression mechanism 22. By repeating such a cycle, the refrigeration cycle apparatus of the embodiment can heat the room where the indoor unit C is disposed.

Here, when the refrigeration cycle apparatus is to be started, or when the temperature in the room (indoor temperature) at the time of cooling operation or the temperature of outside air (outside air temperature) at the time of heating operation is high, or when the temperature of outside air (outside air temperature) at the time of cooling operation or the temperature in the room (indoor temperature) at the time of heating operation is low, a pressure difference is less prone to be generated upstream and downstream of the expansion mechanism 27, the operation of the expansion mechanism 27 becomes unstable, vibration or noise is generated, and that it takes time to start the refrigeration cycle apparatus.

According to the refrigeration cycle apparatus of the embodiment, however, the bypass valve opening operating means 44 is appropriately controlled when the starting pressure difference determination means 42 determines that a pressure difference at the time of starting operation becomes small.

That is, as shown in the time chart in FIG. 7, the refrigeration cycle apparatus is started while reducing an opening of the bypass valve 32 as compared with an opening of the bypass valve 32 at the time of normal operation for the predetermined time (T) after the compression mechanism 22 is started, and the opening of the bypass valve 32 is set to the target opening after the predetermined time (T) is elapsed. Thus, the pressure difference can be generated upstream and downstream of the expansion mechanism 27 for a short time. Therefore, the operation of the expansion mechanism 27 does not become unstable, vibration and noise can be prevented, and the refrigeration cycle apparatus can swiftly be started.

Figure 8:
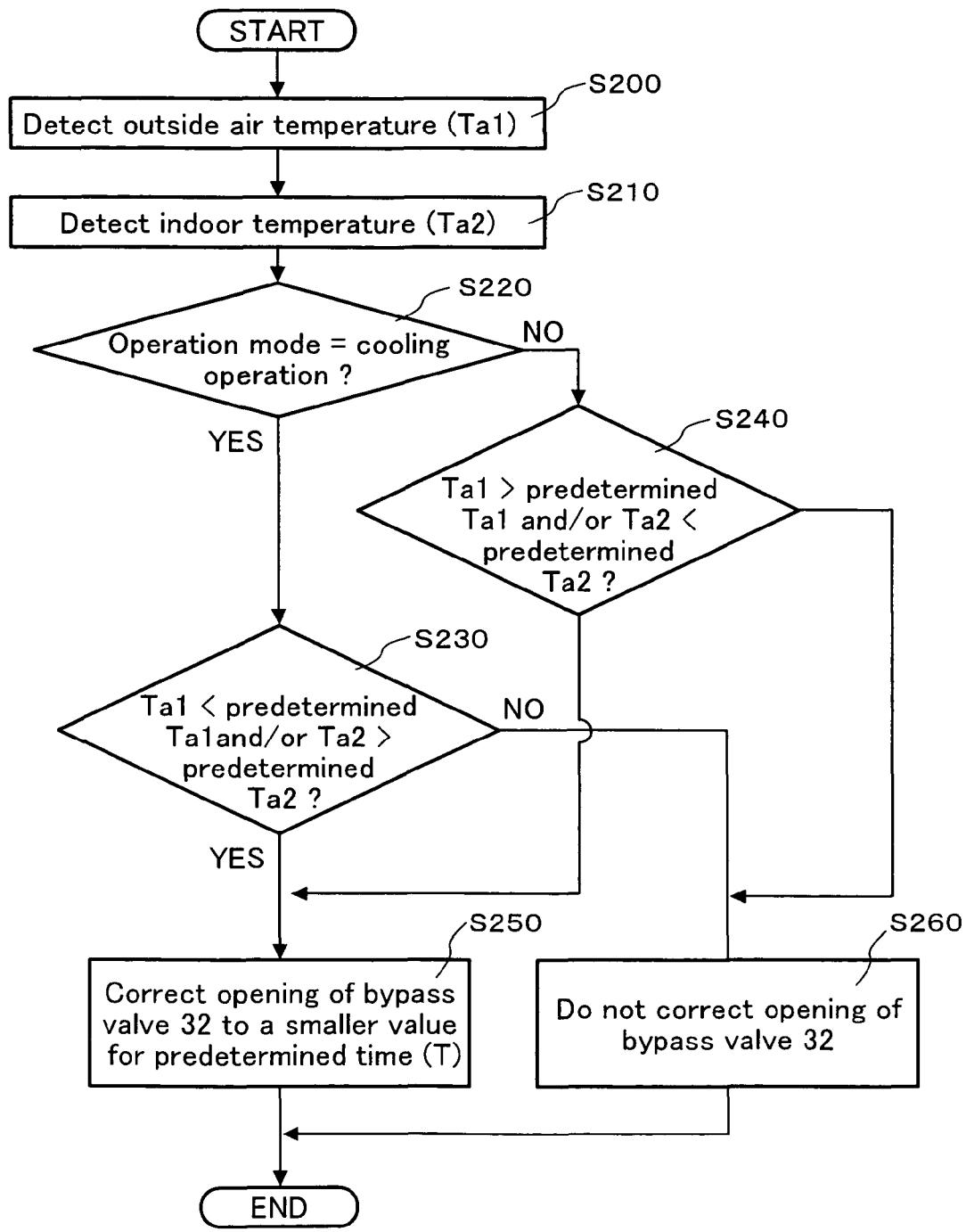
FIG. 8 is a flowchart showing the control method of the refrigeration cycle apparatus of the embodiment.

Next, a further concrete control method will be explained based on a flowchart in FIG. 8 showing the control method of the refrigeration cycle apparatus of the embodiment.

When the refrigeration cycle apparatus is started, a detection value (outside air temperature Ta1) from the outside air temperature detection means 40 is obtained (step 200). A detection value (indoor temperature Ta2) from the indoor temperature detection means 41 is obtained (step 210). Next, it is determined whether the operation mode is a cooling operation mode (step 220). If the operation mode is a cooling operation mode, the procedure is proceeded to step 230, and if the operation mode is a heating operation mode, the procedure is proceeded to step 240.

When the operation mode is the cooling operation mode, a predetermined outside air temperature (predetermined Ta1) which is previously stored in a ROM or the like and the outside air temperature obtained in step 200 are compared with each other (step 230), and/or the indoor temperature (predetermined Ta2) which is previously stored in the ROM or the like and the indoor temperature obtained in step 210 are compared with each other (step 230). When the outside air temperature is lower than the predetermined outside air temperature, and/or when the indoor temperature is higher than the predetermined indoor temperature, the procedure is proceeded to step 250. In other cases, the procedure is proceeded to step 260.

When the operation mode is the heating operation mode, the predetermined outside air temperature (predetermined Ta1) and the outside air temperature obtained in step 200 are compared with each other (step 240), and/or the predetermined indoor temperature (predetermined Ta2) and the indoor temperature obtained in step 210 are compared with each other (step 240), and when the outside air temperature is higher than the predetermined outside air temperature, and/or when the indoor temperature is lower than the predetermined indoor temperature, the procedure is proceeded to step 250. In other cases, the procedure is proceeded to step 260.

When the outside air temperature is lower than the predetermined outside air temperature in the cooling operation mode, and/or when the indoor temperature is higher than the predetermined indoor temperature in the cooling operation mode, or when the outside air temperature is higher than the predetermined outside air temperature in the heating operation mode, and/or when the indoor temperature is lower than the predetermined indoor temperature in the heating operation mode, the opening of the bypass valve 32 is corrected to a smaller value than the opening set by control at the time of normal operation (target opening suitable for the discharge temperature Td in the case of this embodiment for example) for the predetermined time (T) after the compression mechanism 22 is started (step 250). In other cases, the opening of the bypass valve 32 is set to the target opening set by control at the time of normal operation, and the target opening is not corrected (step 260).

According to the control method of the refrigeration cycle apparatus of the embodiment, when the indoor temperature at the time of the cooling operation or the outside air temperature at the time of heating operation is high, or when the outside air temperature at the time of cooling operation or the indoor temperature at the time of heating operation is low, a pressure difference can be generated upstream and downstream of the expansion mechanism 27 for a short time. Therefore, the operation of the expansion mechanism 27 does not become unstable, vibration and noise can be prevented, and the refrigeration cycle apparatus can swiftly be started.

The starting pressure difference determination means 42 determines the pressure difference at the time of starting operation based on the outside air temperature or the indoor temperature. Therefore, it is possible to inexpensively determine whether the pressure difference between upstream and downstream of the expansion mechanism 5 is small without using an expensive pressure sensor.

A correction value for correcting the target opening of the bypass valve 32 or the predetermined time (T) may be varied in accordance with the outside air temperature or the indoor temperature.

In this embodiment, the starting pressure difference determination means 42 determines whether the pressure difference at the time of starting operation is small based on the outside air temperature or the indoor temperature. Alternatively, the starting pressure difference determination means 42 may determinate based on other detection values such as detection values of pressure sensors provided upstream and downstream of the expansion mechanism 27 or a detection value of a temperature sensor which detects the temperature of the heat source-side heat exchanger 24 or the utilizing-side heat exchanger 28. Alternatively, the opening of the bypass valve 32 may always be reduced for the predetermined time (T) without depending on the determination of the starting pressure difference determination means 42.

Fourth Embodiment

Figure 9:
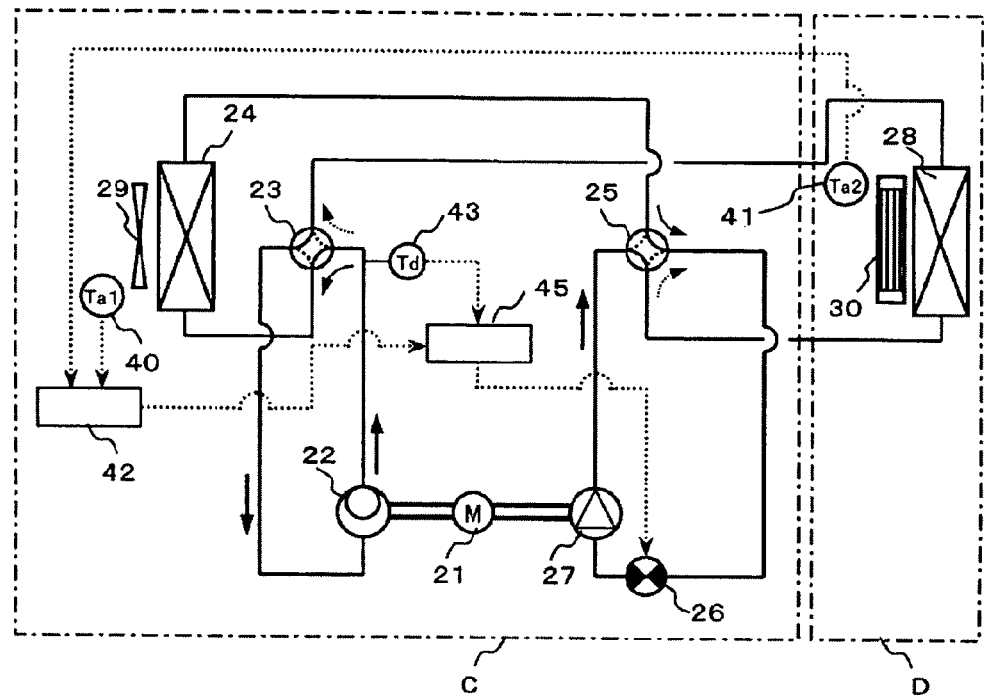
FIG. 9 is a block diagram showing a refrigeration cycle apparatus according to a fourth embodiment of the invention.
Figure 10:
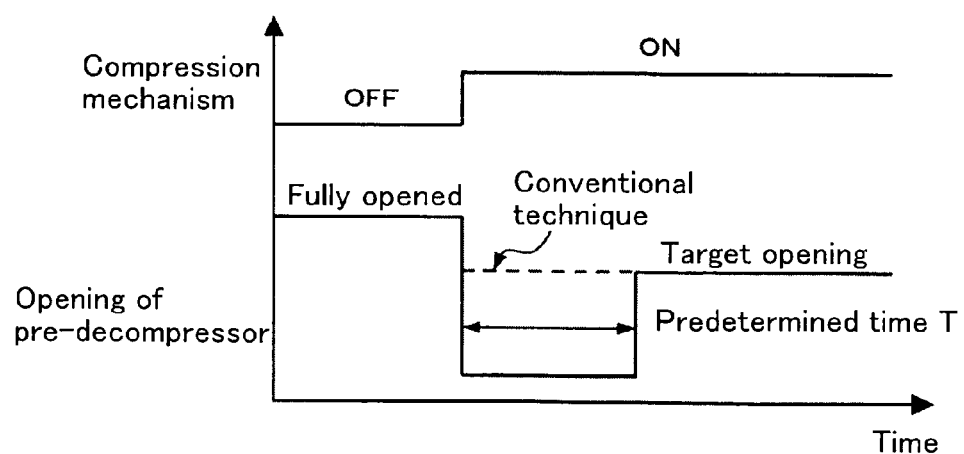
FIG. 10 is a time chart showing a control method of the refrigeration cycle apparatus of the embodiment.

FIG. 9 is a block diagram showing a refrigeration cycle apparatus according to a fourth embodiment of the invention, and FIG. 10 is a time chart showing a control method of the refrigeration cycle apparatus of the embodiment.

In the refrigeration cycle apparatus of the fourth embodiment shown in FIG. 9, the same constituent elements as those of the third embodiment shown in FIG. 6 are designated with the same symbols, explanation thereof will be omitted, and different structure and its operation from those of the third embodiment will be explained.

The refrigeration cycle of the embodiment includes the compression mechanism 22, the first four-way valve 23, the heat source-side heat exchanger 24, the second four-way valve 25, the pre-decompressor 26 which previously decompresses a refrigerant which flows into the expansion mechanism 27, the expansion mechanism 27 and the utilizing-side heat exchanger 28.

In the fourth embodiment, the bypass valve opening operating means 44 of the third embodiment is not provided. Instead, there is provided pre-decompressor opening operating means 45 which calculates and operates the opening of the pre-decompressor 26 based on signals from the starting pressure difference determination means 42 and the discharge temperature detection means 43.

The pre-decompressor opening operating means 45 is appropriately controlled when the starting pressure difference determination means 42 determines that a pressure difference at the time of starting operation becomes small.

That is, as shown in the time chart in FIG. 10, after the compression mechanism 22 is started, the opening of the pre-decompressor 26 is reduced to a value smaller than the opening at the time of normal operation for the predetermined time (T), and after the predetermined time (T) is elapsed, the opening of the pre-decompressor 26 is set to the target opening. Thus, a pressure difference can be generated upstream and downstream of the expansion mechanism 27 for a short time. Therefore, the operation of the expansion mechanism 27 does not become unstable, vibration and noise can be prevented, and the refrigeration cycle apparatus can swiftly be started.

A correction value for correcting the target opening of the bypass valve 32 or the predetermined time (T) may be varied in accordance with the outside air temperature or the indoor temperature.

In this embodiment, the starting pressure difference determination means 42 determines whether the pressure difference at the time of starting operation is small based on the outside air temperature or the indoor temperature. Alternatively, the starting pressure difference determination means 42 may determinate based on other detection values such as detection values of pressure sensors provided upstream and downstream of the expansion mechanism 27 or a detection value of a temperature sensor which detects the temperature of the heat source-side heat exchanger 24 or the utilizing-side heat exchanger 28. Further, the opening of the pre-decompressor 26 may always be reduced at the time of starting operation for the predetermined time (T).

Although the third and fourth embodiments have been explained while taking the case of the air conditioner, the present invention should not be limited to the air conditioner, and the invention may be applied to a water heater. Although the pressure energy at the time of expansion by the expansion mechanism 27 is utilized for assisting the operation of the compression mechanism 22 through the connected shaft, the pressure energy may be electrically recovered using a power generator.

INDUSTRIAL APPLICABILITY

The control method of the refrigeration cycle apparatus and the refrigeration cycle apparatus using the control method can enhance the starting performance in a boiler, an air conditioner, a vehicular air conditioner having the expansion mechanism.

The invention claimed is:

1. A control method of a refrigeration cycle apparatus comprising at least a compression mechanism, a heat source-side heat exchanger, an expansion mechanism from which power is recovered by a power generator, a utilizing-side heat exchanger, a bypass flow path for bypassing said expansion mechanism, and a bypass valve provided on said bypass flow path, further comprising:
    a step for obtaining outside air temperature from an outside air temperature detection means;
    a step for obtaining indoor temperature from an indoor air temperature detection means; and
    a step for determining whether an operation mode is a cooling operation mode or a heating operation mode, wherein
    if said operation mode is said cooling operation mode, a predetermined outside air temperature which is previously stored in a ROM or the like and said obtained outside air temperature are compared with each other, and/or a predetermined indoor air temperature which is previously stored in the ROM and said obtained indoor air temperature are compared with each other, when said outside air temperature is lower than said predetermined outside air temperature, and/or when said indoor temperature is higher than said predetermined indoor temperature, an opening of said bypass valve is corrected to a smaller value than an opening set by a control at a time of normal operation for a predetermined time after said compression mechanism is started, and
    in other cases, said opening of said bypass valve is set to a target opening set by said control at the time of normal operation, and said target opening is not corrected, and
    if said operation mode is the heating operation mode, said predetermined outside air temperature and said obtained outside air temperature are compared with each other, and/or said predetermined indoor temperature and said obtained indoor temperature are compared with each other, and when said outside air temperature is higher than said predetermined outside air temperature, and/or when said indoor temperature is lower than said predetermined indoor temperature, said opening of said bypass valve is corrected to a smaller value than said opening set by said control at the time of normal operation for the predetermined time after said compression mechanism is started, and
    in other cases, said opening of said bypass valve is set to said target opening set by said control at the time of normal operation, and said target opening is not corrected.

2. The control method of the refrigeration cycle apparatus, wherein said expansion mechanism is a scroll type expansion mechanism.

3. A refrigeration cycle apparatus using the control method.

* * * * *